US008235356B2

(12) United States Patent
Rogers

(10) Patent No.: US 8,235,356 B2
(45) Date of Patent: Aug. 7, 2012

(54) AIR VALVE FOR A PAINT GUN

(75) Inventor: John Rogers, Dorset (GB)

(73) Assignee: ITW Limited, Swansea (GB)

( * ) Notice: Subject to any disclaimer, the term of this patent is extended or adjusted under 35 U.S.C. 154(b) by 682 days.

(21) Appl. No.: 11/574,103

(22) PCT Filed: Aug. 22, 2005

(86) PCT No.: PCT/IB2005/002475

§ 371 (c)(1),
(2), (4) Date: Feb. 22, 2007

(87) PCT Pub. No.: WO2006/021860

PCT Pub. Date: Mar. 2, 2006

(65) Prior Publication Data

US 2007/0272152 A1 Nov. 29, 2007

(30) Foreign Application Priority Data

Aug. 25, 2004 (GB) .................................. 0418954.4

(51) Int. Cl.
*F16K 39/04* (2006.01)

(52) U.S. Cl. ......... 251/282; 251/321; 251/325; 251/368

(58) Field of Classification Search .................. 251/222, 251/282, 291, 339, 340, 341, 343, 344, 321, 251/322, 323, 324, 48, 50, 52, 325, 333, 251/368; 239/530, 526, 527, 528; 92/240
See application file for complete search history.

(56) References Cited

U.S. PATENT DOCUMENTS

| | | | | | |
|---|---|---|---|---|---|
| 2,782,610 | A | * | 2/1957 | Martin | 62/160 |
| 2,783,020 | A | * | 2/1957 | Kleczek | 251/63.5 |
| 2,832,223 | A | * | 4/1958 | Couraud | 74/18.2 |
| 2,886,283 | A | * | 5/1959 | Natho | 251/175 |
| 3,037,740 | A | * | 6/1962 | Sheps et al. | 251/282 |
| 3,116,020 | A | * | 12/1963 | Rosen et al. | 239/578 |
| 3,294,362 | A | * | 12/1966 | Schultz et al. | 251/239 |
| 3,388,638 | A | * | 6/1968 | Brinkel | 92/245 |
| 3,892,384 | A | * | 7/1975 | Myers | 251/282 |

(Continued)

FOREIGN PATENT DOCUMENTS

EP 1134028 A2 9/2001

(Continued)

OTHER PUBLICATIONS

Taiwan Search Report for TW094120858.

*Primary Examiner* — Stephen M Hepperle
*Assistant Examiner* — Kevin Murphy
(74) *Attorney, Agent, or Firm* — Lowe Hauptman Ham & Berner LLP

(57) ABSTRACT

An air valve for a paint gun includes a closure member configured for fitting in a valve chamber of a paint gun, which valve chamber intersects an air flow chamber of the gun. The closure member having two sealing points which, in use, when the valve is in its closed configuration, seal against an inner surface of the valve chamber at opposing sides of the air flow chamber thereby closing the airflow chamber. The valve further includes a conduit passing through the closure member providing fluid communication between the first and second sealing surfaces, and a biasing element for biasing the closure member into the closed position when no external load is applied.

7 Claims, 6 Drawing Sheets

U.S. PATENT DOCUMENTS

| | | | | | |
|---|---|---|---|---|---|
| 4,128,209 | A * | 12/1978 | Johnson | 239/583 |
| 4,137,934 | A * | 2/1979 | Rice et al. | 137/270 |
| 4,235,413 | A * | 11/1980 | Baker | 251/11 |
| 4,429,716 | A * | 2/1984 | Conrad | 137/625.35 |
| 5,022,436 | A * | 6/1991 | Portolese | 137/625.35 |
| 5,090,623 | A | 2/1992 | Burns et al. | |
| 5,152,460 | A | 10/1992 | Barty et al. | |
| 5,884,655 | A * | 3/1999 | Ostand | 137/209 |
| 6,176,437 | B1 * | 1/2001 | Pedersen | 239/99 |
| 6,283,152 | B1 * | 9/2001 | Corte et al. | 137/614.11 |
| 6,460,567 | B1 * | 10/2002 | Hansen et al. | 137/554 |
| 2004/0011978 | A1 * | 1/2004 | Shen et al. | 251/51 |
| 2004/0011986 | A1 * | 1/2004 | Faramarzi | 251/282 |

FOREIGN PATENT DOCUMENTS

| | | | |
|---|---|---|---|
| EP | 1375013 | A2 | 1/2004 |
| TW | 326434 | | 2/1998 |
| TW | 344681 | | 11/1998 |
| TW | 402524 | | 8/2000 |
| TW | 402972 | | 8/2000 |
| TW | 545486 | | 8/2003 |

* cited by examiner a)

b)

AIR VALVE FOR A PAINT GUN

RELATED APPLICATIONS

The present application is a National Phase entry of International Application Number PCT/IB2005/002475, filed Aug. 22, 2005, which claims priority from, British Application Number 0418954.4, filed Aug. 25, 2004, the disclosures of which are hereby incorporated by reference herein in their entirety.

TECHNICAL FIELD

The present invention relates to paint spray guns and in particular to a valve for the air inlet passage of a paint spray gun.

BACKGROUND

A typical paint spray gun comprises a gun body with an integral handle pendant from one end of the body and a spray head provided at the opposite end of the body. At an extremity of the integral handle is an air inlet to which a supply of compressed air can be connected. The air inlet extends into a passage which passes though the handle of the gun to the gun body. A paint inlet is provided in an outer surface of the body of the gun. The paint inlet extends into a paint passage also passing through the gun body. The incoming air encounters the incoming paint and atomises it at the spray head thereby producing the paint spray.

The flow of both air and paint through the gun body is controlled by valves. Typically, both valves can be opened by means of a single trigger mounted on the handle.

In practice, it is often desirable to open only the air valve in the first instance so that a work piece may be "blown down" prior to painting. This involves blasting of the work piece with pressurised air so as to remove dust from the surface prior to painting. This is typically achieved by the operator applying light pressure to the trigger in the first instance which causes the air valve to open, and subsequently to apply greater pressure, which maintains the air valve open and opens the paint valve.

The type of valve typically used to control air flow is known as a poppet valve. Examples of prior art poppet valves are illustrated in the accompanying figures and are described in more detail below. When these valves are closed, an excess of air pressure acting on the rear of the valve compared to in front of the valve applies a load which needs to be overcome when the valve is first opened. Once the valve is partially open, air pressure around the valve begins to equalise and relatively less load need be applied to further open the valve. In applying the higher load so as to open the air valve, it is known for operators to inadvertently overshoot the position where only the air valve is open, opening the paint and air valves and sputtering the work piece with paint rather than blow it down.

Previous attempts to reduce the initial load required to open the valve have focussed on reducing the area of the air valve. However, as air valve area decreases, pressure drop across the valve increases. Excessively high pressure drops are unacceptable as these require high pressures at the air inlet, which can prove difficult to supply in many workshops.

SUMMARY

The present invention provides a novel design of valve which alleviates the problems discussed above without total reliance on a reduction of the valve area.

In accordance with the present invention there is provided an air valve for a paint gun comprising a closure member configured for fitting in a valve chamber of a paint gun, which valve chamber intersects an air flow chamber of the gun, the closure member having two sealing points which, in use, when the valve is in its closed configuration, seal against an inner surface of the valve chamber at opposing sides of the air flow chamber thereby closing the airflow chamber, a conduit passing through the closure member providing fluid communication between the first and second sealing surfaces and biasing means for biasing the closure member into the closed position when no external load is applied.

The closure member is desirably substantially cylindrical in shape with the sealing points comprising flanged portions of slightly larger radius than the cylindrical main body. In such an embodiment, the biasing means may be a spring, optionally a compression spring positioned with its axis in alignment with the longitudinal axis of the cylindrical closure member. In an alternative embodiment, the seal to the front of the closure member (with respect to the direction of the biasing force) is of slightly larger diameter than that to the rear of the closure member. It will be appreciated, such an arrangement results in an imbalance of air pressure on the closure member, tending to hold the closure member in the closed position. In this embodiment, the imbalance in air pressure resulting from the different seal diameters provides the biasing means.

In one option, the seal to the rear of the closure member may comprise a rolling diaphragm.

One or more conduits are desirably provided through a front face of the closure member communicating with the conduit passing through the closure member. Desirably, the conduit passing through the closure member extends longitudinally of the closure member and exits to the rear of the closure member. In an alternative, one or more conduits are provided in a spindle of a trigger valve used to open the valve closed by the closure member, the one or more conduits being provided in fluid communication with the conduit passing through the closure member.

The closure member is desirably comprised of carbon filled PTFE. This material has suitable mechanical properties for handling loads incurred by the closure member when in use in a paint spray gun and also is resistant to chemicals typically used for cleaning such guns. Other suitable materials will no doubt occur to the skilled reader and are not intended to be excluded from the scope of the claims of this patent. Many plastic materials provide suitable alternatives to PTFE, examples including; polyethylene, polypropylene, acetal and nylon.

The provision of the various conduits through the closure member body provide that when the valve is opened and air enters through the air inlet of the gun, the air pressure to the front of the closure member is quickly balanced with air pressure to the rear of the closure member by movement of air through the conduits. Thus, the load required to open the air valve is significantly reduced compared to prior art valves and the risk of an operator overshooting the position where only the air valve is open is correspondingly reduced.

It will be understood that the proposed valve design will accommodate flow of air through the valve in either of two opposing directions. This can be accommodated by adjusting the direction of sealing of the seal to the rear of the closure member, i.e. for each direction of flow, the direction of sealing would be opposite to that for the other direction of flow.

BRIEF DESCRIPTION OF THE DRAWINGS

In order that the invention may be better understood, embodiments of prior art air valves and of the invention are described in detail below with reference to the accompanying figures in which.

DETAILED DESCRIPTION OF THE DRAWINGS

Figure 1:
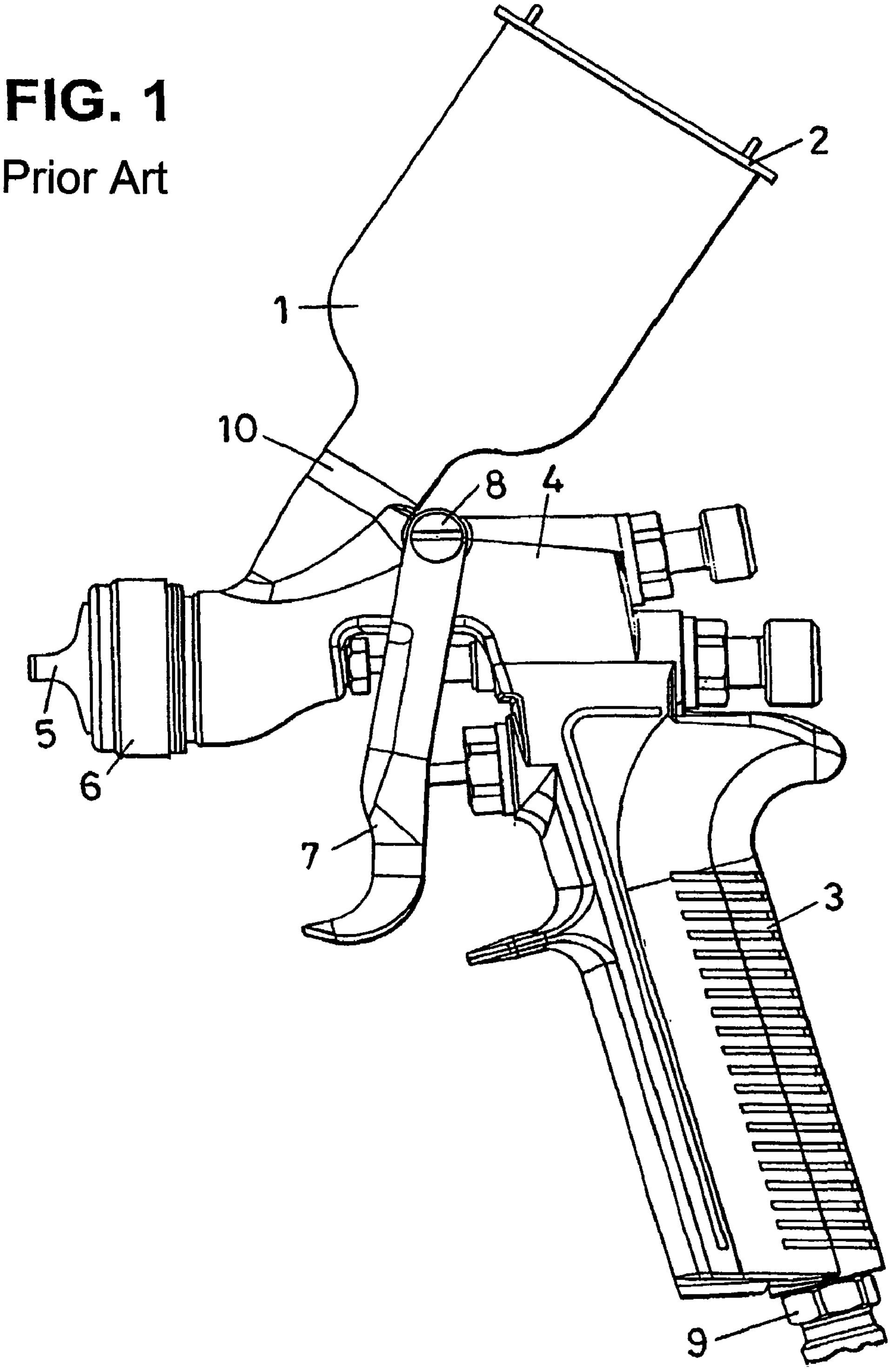
FIG. 1 Prior Art
FIG. 1 illustrates an embodiment of a gravity fed paint spray gun known from the prior art.

As can be seen from FIG. 1, a typical gravity fed paint spray gun comprises a paint cup 1 secured to a paint gun body 4 by means of a paint inlet 10. The gun has a main body 4 from one end of which is dependant a handle 3. At an extremity of the handle is an air inlet 9 to which a source of pressurised air or other gas (not shown) may be connected.

At an opposing end of the body there is provided a spray head 6 from which air and paint are ejected. Paint exiting nozzle 5 mixes with pressurised air exiting the spray head and is atomised. Midway along the body 4 of the gun is provided a trigger valve 7 which is hingedly connected to an outer surface of the gun body by means of hinge 8. The trigger valve 7 is operated by first gripping the handle 3 of the gun, then pulling the trigger 7 towards the handle 3. Small depression of the trigger 7 opens an air valve (not shown) located within the body 4 of the gun and greater depression of the trigger 7 opens both the air valve and a paint valve (not shown).

Figure 2:
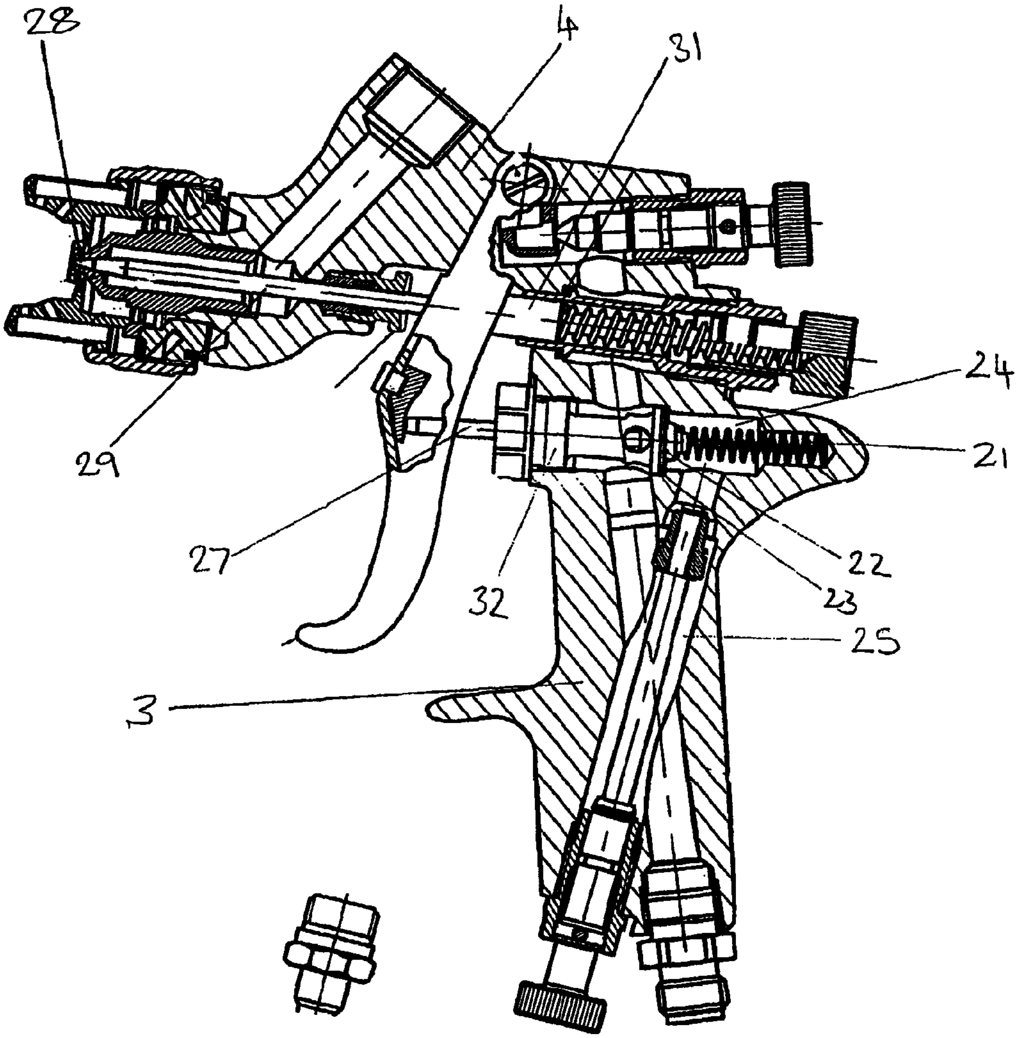
FIG.2 Prior Art
FIG. 2 illustrates in section the paint spray gun of FIG. 1 showing an embodiment of a typical spring poppet valve as conventionally used in the gun.
Figure 3:
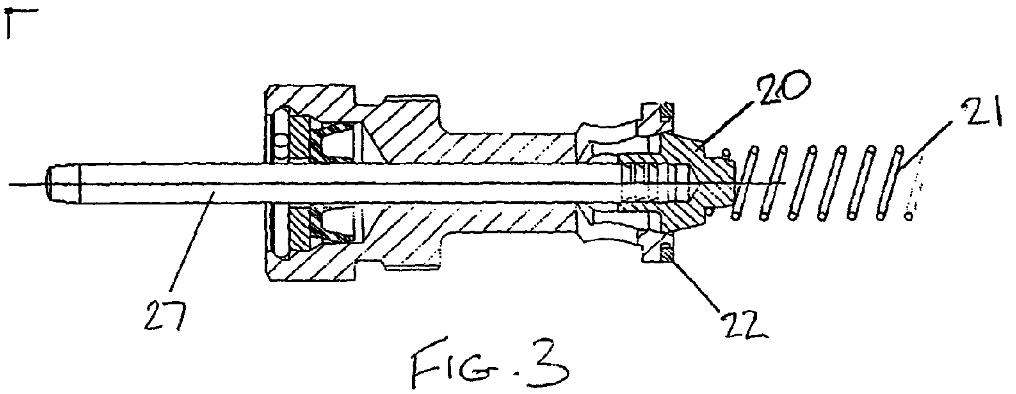
FIG. 3 Prior Art
FIG. 3 illustrates in section the poppet valve of FIG. 2.

FIG. 2 shows the gun of FIG. 1 in section exposing a poppet valve seated in a valve chamber 24 which intersects an air inlet passage 25 which passes through the gun body 4. FIG. 3 shows the poppet valve of FIG. 2 in cross section. The poppet valve comprises a closure member 20 which is biased in a closed position across the air passage 25 by means of a compression spring 21. The valve seals against a valve locator 32 which in turn seals on a step of the valve chamber 24 by means of a square section O-ring seal 22. To the front of the valve is a trigger 26 which connects with the closure member 20 by means of a spindle 27. in turn, the trigger 26 connects with a paint valve 28 by means of a second spindle 29.

The spindle 27 is guided through a conduit in a valve locator 32 which also holds the closure member 20 in position in the valve chamber 24.

When operating the gun, an operator depresses the trigger 26 against the handle 3 of the gun. As the trigger 26 depresses, the closure member 20 is pushed against the compression spring 21 opening the air inlet valve and allowing air to flow in the passage 25 and pass through the gun body 4. As the trigger 26 is depressed further, an inner surface of the trigger meets a stop 31 connected to the second spindle 29 and begins to draw open the paint valve 28 allowing paint as well as air to flow through the gun body 4. The paint and air are ejected from the spray head 6 and the paint atomised to form a spray.

Figure 4:
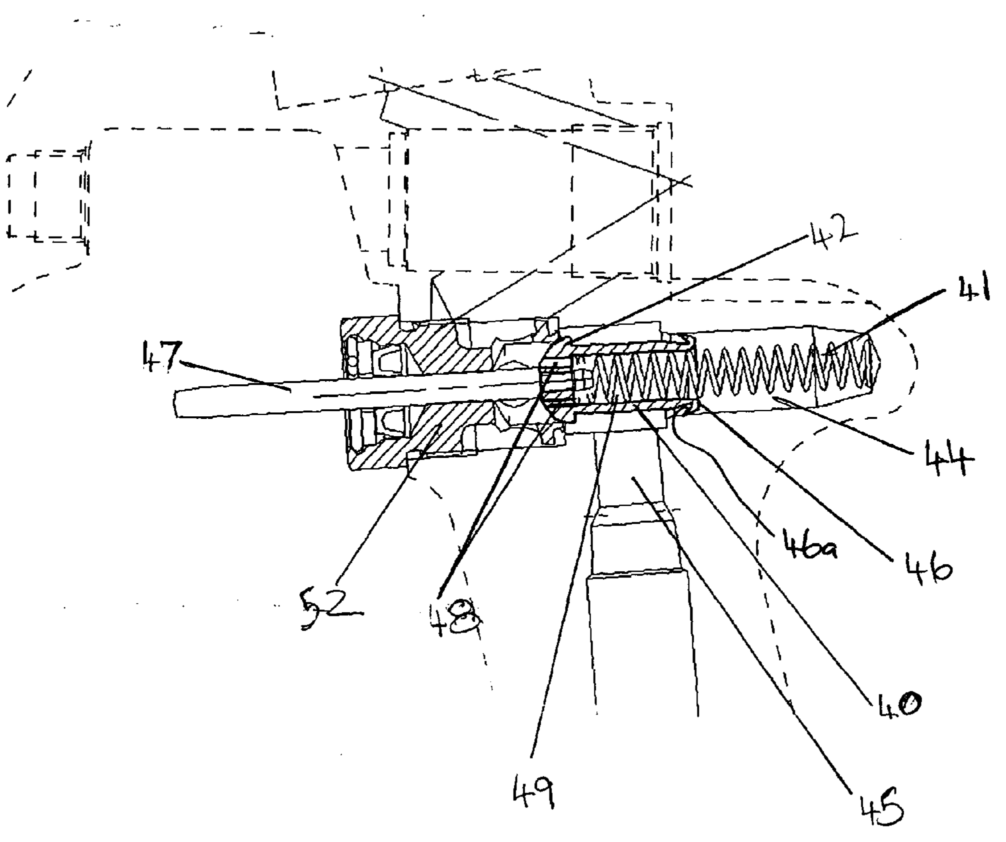
FIG. 4 illustrates in section an embodiment of a poppet valve in accordance with the present invention.

FIG. 4 shows an embodiment of a poppet valve in accordance with the present invention, the outline of a paint gun into which the poppet valve may be fitted is shown in dotted outline.

The novel poppet valve has many features in common with the prior art valve as shown in FIGS. 2 and 3 for example; a closure member 40 which closes an air inlet passage 45 connected with a spindle 47 and having a seal 42 which seals against an inner wall of the valve chamber 44. The poppet valve is distinguished from the prior art by the provision of a second seal 46 which seals an inner wall of the valve chamber 44 on an opposing side of the air passage 45 to the first seal 42. In addition, there is provided a plurality of holes 48 through a front face of the closure member 40 which communicate with a conduit 49 which connects the first seal 42 with the second seal 46.

As can be seen, a cylindrical groove **46*a* is provided on front facing surface of the rear seal 46**.

Figure 5:
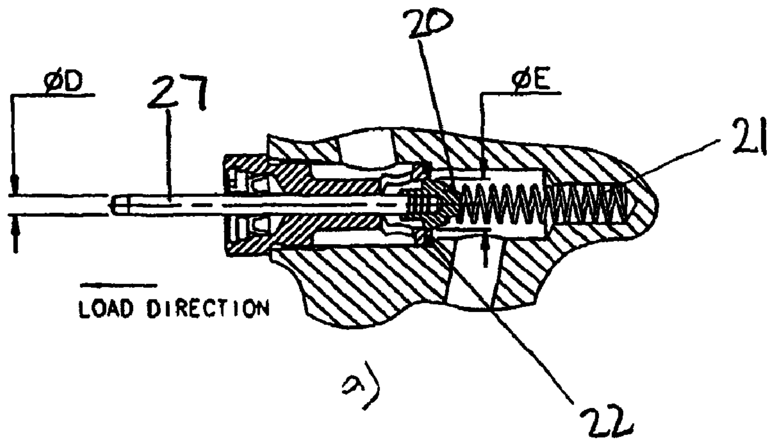
FIG. 5 Prior Art
FIG. 5 illustrates the poppet valve of FIGS. 2 and 3 in an open and closed configuration.
Figure 5:
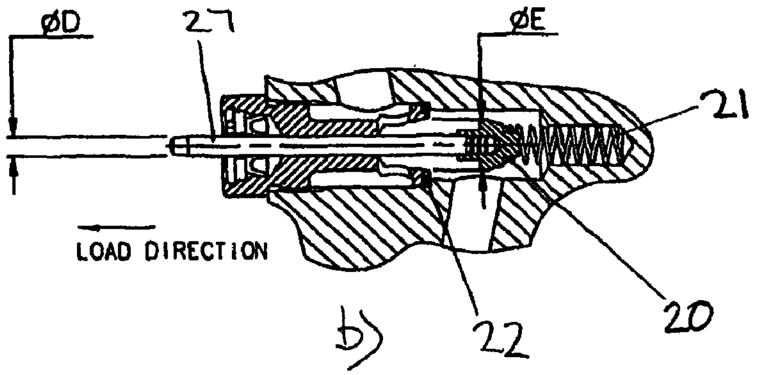
FIG. 5 Prior Art

FIG. 5 shows the poppet valve of FIGS. 2 and 3 first in a closed configuration (FIG. **5*a*) and second in an open configuration (FIG. 5*b*). When the valve is in the closed configuration as shown in FIG. 5*a*, there is a high static pressure acting on the rear of the valve head 20 producing a significant force to be overcome when opening the valve. Once opened as shown in FIG. 5*b*, a reduced pressure caused by dynalic flow acts on the small area of the valve spindle 27** which will produce a small load tending to close the valve.

Figure 6:
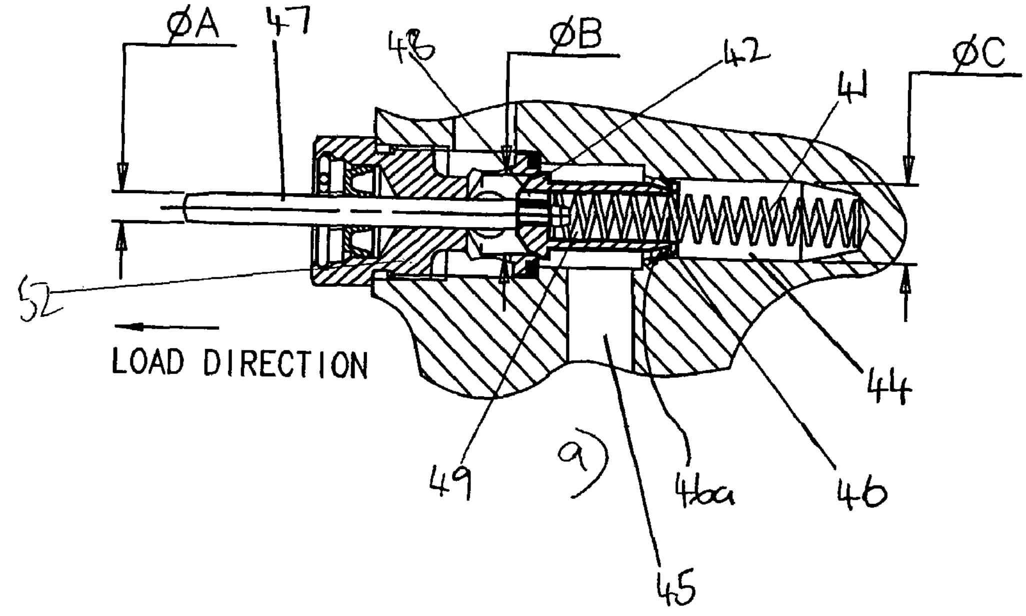
FIG. 6 illustrates the poppet valve of FIG. 4 in an open and closed configuration.
Figure 6:
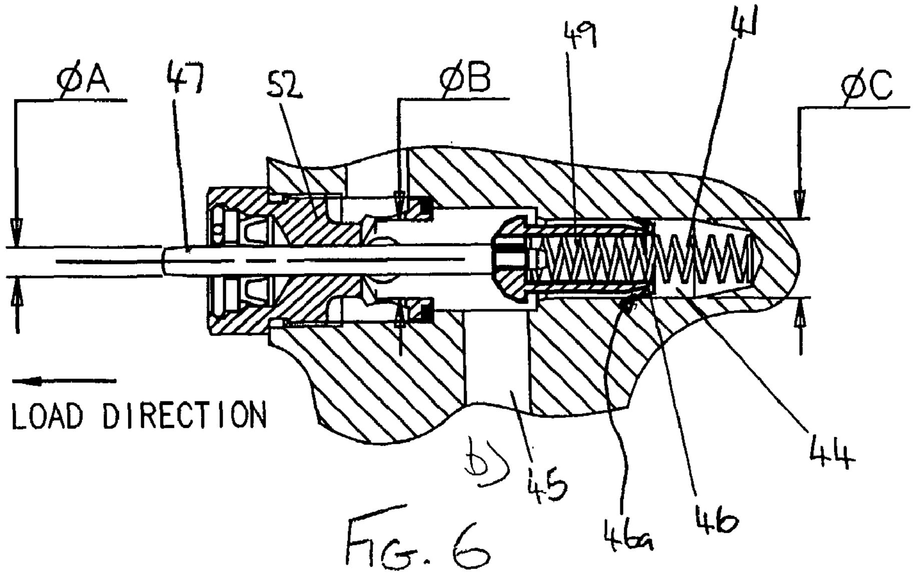

FIG. 6 shows the poppet valve of FIG. 4 first in a closed configuration (FIG. **6*a*) and second in an open configuration (FIG. 6*b***). A zero load due to area and pressure is achieved in this novel valve by balancing the forces in both directions, i.e., ØB=ØC. If required, in order to have a load bias to help seal the valve, ØB can be increased so as to be slightly greater than ØC and thus generate a small load. Equally, in an alternative, ØC can be increased so as to be slightly greater than ØB.

As can be seen, where the spindle 47 locates in the head of the closure member 42, there is a barbed geometry that prevents the spindle's removal whilst at the same time maintaining a clearance around the shaft of the spindle 47. The clearance assists in negating any eccentricity that the spindle in its located position may impart onto the head 42. this allows the head 42 to float and centre itself within the surrounding valve housing thus reducing any incidence of air leakage which may arise due to misalignment.

The attached Table 1 sets out valve loading conditions in a conventional poppet valve (FIG. 5) as compared to the poppet valve of the invention (FIG. 6). As can be seen the loads for the closed valve of the invention are considerably smaller than for the conventional valve.

Whilst the Figures illustrate only a gravity fed paint gun, it is to be understood that the poppet valve of the invention has application in other types of spray gun as well as gravity fed guns.

TABLE 1

Example valve loading conditions

| Spring loads | | | | | |
|---|---|---|---|---|---|
| Valve Closed | 5 | N | | | |
| Valve open | 10 | N | | | |
| ØA | 3 | mm | Area A | 7.07 | $mm^2$ |
| ØB | 8 | mm | Area B | 50.27 | $mm^2$ |
| ØC | 8 | mm | Area C | 50.27 | $mm^2$ |
| ØD | 3 | mm | Area D | 7.07 | $mm^2$ |
| ØE | 8 | mm | Area E | 50.27 | $mm^2$ |
| P | 6 | Bar | | | |

TABLE 1-continued

| Example valve loading conditions | | | | | |
|---|---|---|---|---|---|
| Shaft Loads | | | Shaft loads without spring force | | |
| Valve closed | | | Valve closed | | |
| FIG. 6a | 5.0 | N | FIG. 6a | 0.0 | N |
| FIG. 5a | 35.2 | N | FIG. 5a | 30.2 | N |
| Valve open | | | Valve open | | |
| FIG. 6b | 14.2 | N | FIG. 6b | 4.2 | N |
| FIG. 5b | 14.2 | N | FIG. 5b | 4.2 | N |

Note:
1 - Friction forces have been omitted
2 - In reality when the valve is open, P will be less than the value used, due to the pressure drop under dynamic conditions.
3 - The values represent those on the end of the shaft, and not those applied at the trigger.
4 - All valves have the same open valve area for air flow.

The invention claimed is:

1. An air valve for a paint gun, said air valve comprising:
an air flow chamber;
a valve chamber intersecting the air flow chamber;
a closure member slidable in the valve chamber, the closure member having
a main body having therein a conduit,
front and rear seals larger in outer diameter than the main body and configured to respectively seal against front and rear inner sealing surfaces of the valve chamber at opposing front and rear sides of the intersected air flow chamber, thereby closing the airflow chamber when the closure member is in a closed position,
a head which is at a front end of the main body and on which the front seal is positioned, and
at least one hole extending through the head to be in fluid communication with the conduit for connecting the front seal and the rear seal; and
a biasing element biasing the closure member forward to the closed position when no external load is applied;
wherein the rear seal has
a lateral face in sealing contact with the rear inner sealing surface of the valve chamber, and
a front face which faces toward the head and which has a rearwardly recessed, circumferential groove of a smaller diameter than the lateral face of the rear seal,
wherein an entirety of the front face is in non-sealing contact with the rear inner sealing surface of the valve chamber,
wherein the airflow chamber is an air inlet intersecting the valve chamber for supplying air into the valve member, and
wherein an entirety of the closure member, including the head, the main body and the front and rear seals, is an integral piece of a plastics material.

2. An air valve as claimed in claim 1, wherein the plastics material is selected from the group consisting of PTFE, polyethylene, polypropylene, acetal and nylon.

3. An air valve as claimed in claim 1, wherein the rear seal and the rear inner sealing surface of the valve chamber define the only sealing contact between the closure member and the valve chamber rearward of the intersected air flow chamber.

4. An air valve as claimed in claim 1, further comprising a spindle located in the head of the closure member with a clearance maintained around a shaft of the spindle.

5. An air valve as claimed in claim 4, wherein said at least one hole comprises multiple holes extending through the head and around the spindle.

6. An air valve as claimed in claim 1, wherein the biasing element comprises a compression spring.

7. An air valve as claimed in claim 1, wherein the front seal has a larger diameter than the rear seal, said biasing element being defined exclusively by an imbalance in air pressure resulting from the different seal diameters.

* * * * *